Feb. 13, 1934.  F. JUDGE  1,946,584
PILOT FOR REAMERS
Filed July 24, 1930
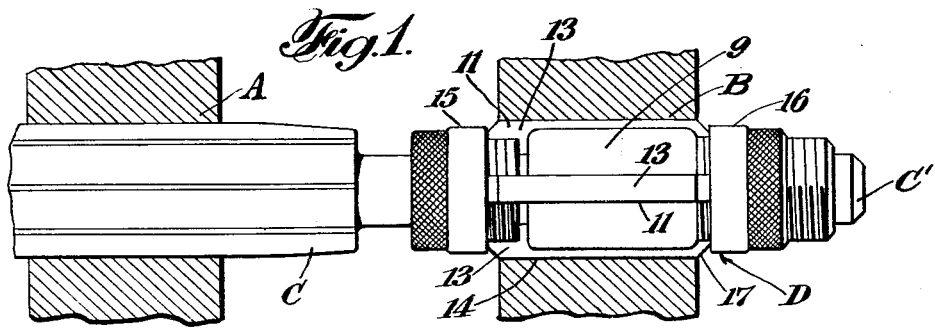
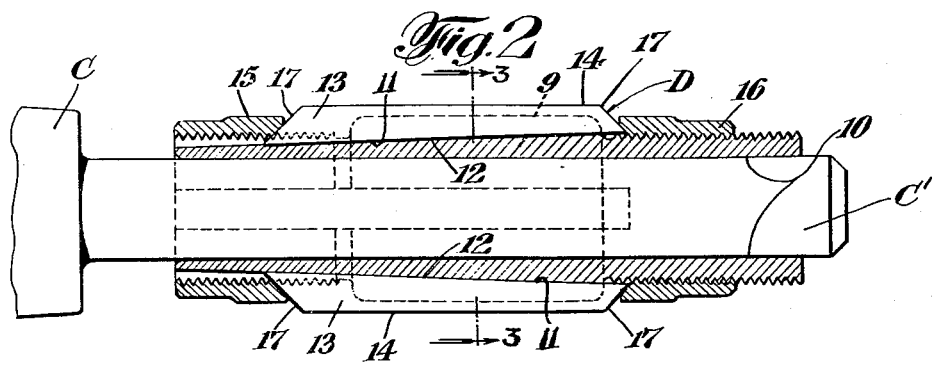
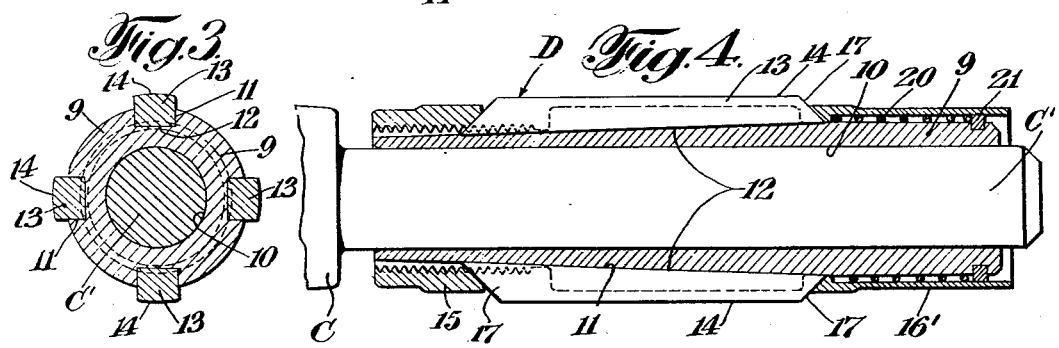
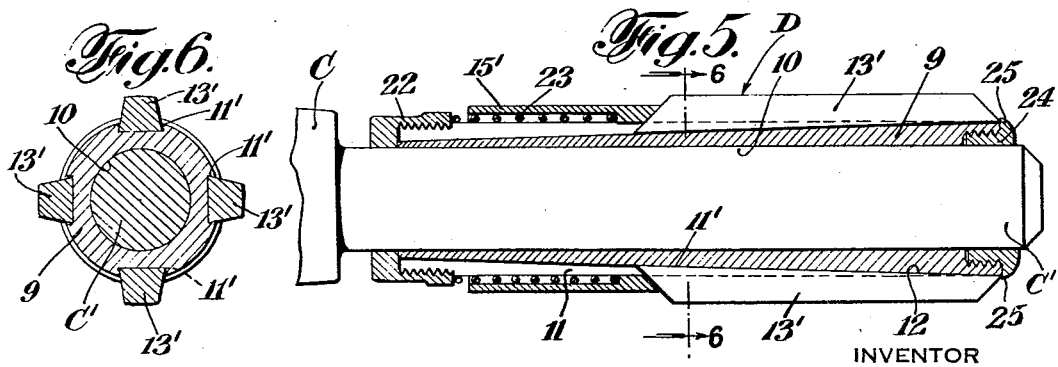
INVENTOR
Franklin Judge
BY
Edwards, Bower & Pool
ATTORNEYS Patented Feb. 13, 1934

1,946,584

UNITED STATES PATENT OFFICE 1,946,584

PILOT FOR REAMERS

Franklin Judge, Greenfield, Mass., assignor to Greenfield Tap and Die Corporation, a corporation of Massachusetts Application July 24, 1930. Serial No. 470,310

1 Claim. (Cl. 77—72)

This invention relates to a pilot or guide for reamers or the like adapted to maintain the reamer in proper alinement.

Where a hole is to be reamed in coaxial alinement with another guide hole or bearing, it is important to accurately center the reamer with relation to the latter, and to maintain this centering throughout the reaming operation.

The object of this invention is to provide a guide or pilot which may be accurately positioned and fixed within the guide hole and which will serve as a bearing for the rotary reamer parts to maintain the reamer precisely centered during its operation.

A further object of the invention is to provide a guide which will be simple in structure and positive in action, and providing accurately alined contacts with the surface of the guide hole to exactly center the guide with relation thereto.

In the accompanying drawing

Fig. 1 is a partial sectional view showing the reamer and pilot in place,

Fig. 2 is an enlarged sectional view of the pilot in place on the reamer extension, Fig. 3 is a cross section view taken on line 3—3 of Fig. 2, Figs. 4 and 5 are similar to Fig. 2, but illustrating modifications, and Fig. 6 is a sectional view taken on the line 6—6 of Fig. 5 looking in the direction of the arrows.

In the embodiment of the invention shown in Fig. 1 the hole being reamed is indicated at A and the guide hole at B. The reamer is shown at C and is illustrated as a solid conventional type with a pilot extension C' incorporated in the design of the body.

The guide or expanding pilot D is shown in position in the hole of the bearing B and with the bore 10 (see Figs. 2 and 3) of the pilot receiving and accurately centering the extension C' so that the reamer hole A will be precisely concentric with the guide hole B. The pilot D comprises a body portion or bushing 9 of generally tubular or cylindrical form with an inner bore 10 and outer milled slots 11 having their bottom surfaces 12 machined at an angle to be in planes longitudinally inclined at equal angles with respect to the axis of the bore 10 and equally spaced from this axis.

The wedge members 13 slide in the slots 11 and are tapered to the exact angle of inclination of the surfaces 12 so that the cylindrically ground gripping surfaces 14 of these members are always exactly parallel to the axis of the bore 10.

The body 9 is threaded at each end to receive the knurled nuts 15 and 16, which are conically beveled to fit the correspondingly beveled ends 17 of the wedges 13 and to adjust and hold the wedges in firm position against the bottoms of the milled slots 11 with the ends of the wedges precisely alined, and their outer surfaces 14 equally spaced from the axis of the bore 10.

In practice the nuts 15 and 16 of the expansible pilot D are turned to move the wedges 13 into snug engagement with the interior of the guide hole B, these nuts being tightened to exactly aline the wedges longitudinally and press them against the surfaces 12 of the slots 11 so that both the gripping pressures on the surfaces 14 and the positioning pressures on the end 17 are in the same direction tending to hold the wedges against the surfaces 12 and accurately centering the pilot D with respect to the guide hole B. The only limit on the exactness of this alinement is the accuracy of the machining and grinding of the parts.

The pilot is thus very precisely and firmly held in its guiding position and any stresses received from the reamer extension C' within the bore 10 will be transmitted directly through the surfaces 12 and wedges 13 to the interior of the guide hole or bearing B.

As illustrated for instance in Fig. 4, a spring-pressed sleeve 16' may be used in place of the knurled nut 16, the spring 20 being held in place by the split ring 21. As illustrated in Fig. 5 the slots 11' may be undercut to hold the wedges 13' from dropping out and a spring-pressed sleeve 15' used to force the wedges toward the expanded position, the end nut 22 holding the spring 23 in place and the screw 24 at the other end having its head overhanging as indicated at 25 to serve as a stop for these wedges. With the pilot of Fig. 5 the sleeve 15' when drawn toward the left will permit the wedges 13' to contract by movement in the same direction so that the pilot may be fitted within the guide hole B, and then the movement of the sleeve 15' to the right due to expansion of the spring 23 will force the wedges out into engagement with the interior surface of the guide hole.

The slots 11 may be milled, as described, or they may be formed by planing, broaching or die casting, and while the gripping surfaces 14 of the wedges 13 have been illustrated as having straight line elements parallel to the axis of the bore 10 in order to fit the cylindrical inner surface of the guide hole B, it is obvious that the shape of these gripping surfaces may be altered to be tapered or otherwise irregular to conform to the shape of the inner surface of the guide hole in case this is tapered or rounded or otherwise departs from truly cylindrical form.

I claim:

An expansible pilot for reamers and the like adapted to engage a guide hole and comprising a body portion having a central axis and a plurality of symmetrically disposed slots inclined to the axis of the guide, wedge members guided by said slots and expanding or contracting when moved longitudinally of said pilot and having outer surfaces of predetermined form with respect to the inner surfaces of said guide holes so as to engage said surfaces and retain said pilot against rotation, abutment means at one end engaging the ends of said wedges and spring means at the other end pressing said wedges toward said abutment under yielding pressure of such strength that end pressure on the wedges will move them downward in said slots to permit contraction of the pilot to fit a guide hole, said spring means resiliently pressing said wedges outward to retain the pilot in place in said hole so that said pilot is automatically self-adjusting to fit and hold itself in said hole.

FRANKLIN JUDGE.